INVENTOR.
HAROLD MOREINES
BY Herbert L. Davis
ATTORNEY

INVENTOR.
HAROLD MOREINES
BY Herbert L. Davis
ATTORNEY

INVENTOR.
HAROLD MOREINES
BY Herbert L. Davis
ATTORNEY

INVENTOR.
HAROLD MOREINES
BY
Herbert L. Davis
ATTORNEY

United States Patent Office 3,311,837

Patented Mar. 28, 1967

3,311,837

SIGNAL LIMITING AND THRESHOLD MEANS IN ELECTRONIC COMPUTING AND CONTROL SYSTEMS

Harold Moreines, Springfield, N.J., assignor to The Bendix Corporation, Teterboro, N.J., a corporation of Delaware Filed Dec. 16, 1963, Ser. No. 330,819
19 Claims. (Cl. 328—169)

This invention relates to signal selection techniques for limiting signal levels and to effect threshold means in electronic analog data processing and control systems and more particularly to a novel application of a signal selective device to limit the maximum excursion of signal voltages transmitted through it as in electronic computing and control systems and to apply such limiter so as to effect a novel threshold means.

The signal selective device may be of an intermediate amplitude selective gate type (IASC) such as disclosed and claimed in U.S. application Ser. No. 314,397, filed Oct. 7, 1963, by Harold Moreines, and assigned to The Bendix Corporation, assignee of the present invention.

The requirement for signal limiting arises in many analog computing and control systems. For example, in analog computation and simulation, a voltage limit may be required to represent a physical limit on the variable represented by the voltage. As another example, it is often required to limit the command voltage to an automatic flight control system surface actuator in order to prevent excessive maneuvers that might overstress the aircraft structure.

Conventional means for voltage limiting use nonlinear circuit elements, such as biased diodes, to effect a discrete change in the attenuation ratios between input and output. Thus, for input signal levels less than the limiting value, ideally the ratio of output to input voltage is unity. For input signal levels greater than the limiting value, ideally the ratio of incremental output to input voltage is zero. However, due to restrictions on component impedance levels and power dissipation, and imperfect diode characteristics, the actual limiter performance can only approximate that of the ideal limiter.

An object of this invention is to provide a limiter that is superior to conventional limiting means in terms of (1) limiting capability, (2) flexibility to provide asymmetrical as well as symmetrical limits, (3) performance that is relatively independent of component variations, and (4) flexibility for use with various forms of data.

Another object of the invention is to provide a novel intermediate-amplitude signal selection means so that a desired output voltage selected is either the input signal or one of two reference signals chosen so as to equal the required output limits when the input exceeds these levels.

Furthermore, in limiting the command voltage applied by operation of a pilot's control stick of a type such as disclosed and claimed in U.S. Patent No. 3,057,585, granted Oct. 9, 1922, to John C. Ziegler et al., and assigned to The Bendix Corporation, there have been heretofore provided low-pass filters so arranged that the inertia of the pilot's hand and the spring rate of the control column will not form an oscillating system in varying the setting of the automatic pilot control system. Such filters, however, add complexity, unreliability, and undesirable drift.

Another object of the invention is to provide a voltage signal threshold means having an accurate threshold type characteristic so arranged that small forces will be ineffective to provide a controlling action. Thus, there may be reduced the undesirable effects of cross-coupling between pitch and roll axes of a pilot's control column so that the inertia of the pilot's hand and the spring rate of the control column will not form an oscillating system in varying a setting of the automatic pilot control system due to the fact that there is essentially zero gain about the neutral position of the control column.

Another object of the invention is to provide an intermediate amplitude selective gate limiting means connected across a differential amplifier and so arranged that so long as the input signal is within a predetermined limited range, the output signal will equal that of the input signal so that there will be no controlling differential signal applied at the output of the differential amplifier. However, upon the input signal exceeding a limiting reference voltage, the output signal will be limited by the limiting reference voltage so that the differential between the input signal and the limited output signal as sensed by the differential amplifier will provide a controlling output signal in which the range between the limited values of the reference voltages provides a threshold type characteristic which prevents transference to the control system of oscillations of the control column due to inertia of the pilot's hand or the spring rate of the control column.

These and other objects and features of the invention are pointed out in the following description in terms of the embodiments thereof which are shown in the accompanying drawings. It is to be understood, however, that the drawings are for the purpose of illustration only and are not a definition of the limits of the invention. Reference is to be had to the appended claims for this purpose.

Figure 2:
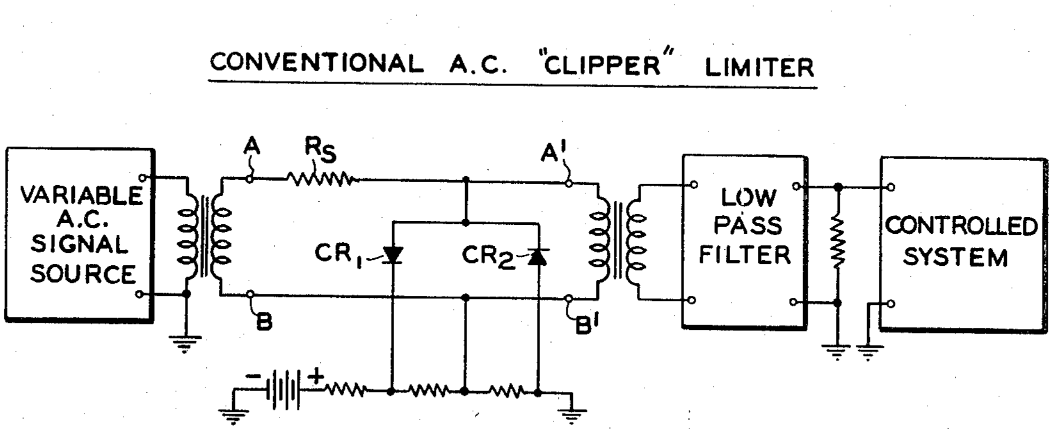
FIGURE 2 is a wiring diagram of a conventional A.C. "clipper" type limiter.

Referring to FIGURE 2 there is shown a schematic diagram of a typical "clipper" type limiter for A.C. signals. It should be noted, however, that the two diodes CR1 and CR2 normally reverse-biased by a D.C. voltage, are essentially open circuited unless the signal voltage impressed across terminals A–B is great enough to forward bias one of the diodes. At such times, the value of the bias voltage appears across A'B' (neglecting diode voltage drop), and if the signal is sinusoidal, the sinusoid will be truncated at the bias level (that is, "clipped") during each half cycle. The resulting distortion in waveform can be corrected to some extent by passing the clipped signal through a low-pass filter as shown in the controlled system.

To avoid waveform distortion, a modification of the conventional limiter has been employed to apply sinusoidal rather than D.C. bias levels to the diodes. This type of limiter is shown in FIGURE 3 and has been described and claimed in U.S. Patent No. 2,683,226, granted July 6, 1954, to Michael Kerpchar, and assigned to The Bendix Corporation.

Figure 3:
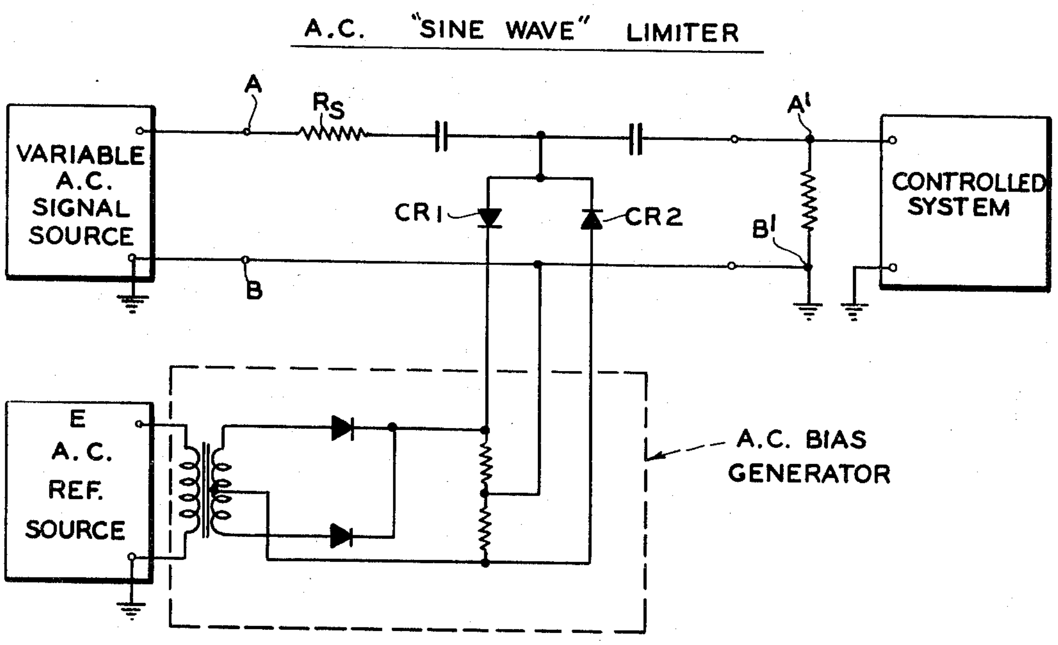
FIGURE 3 is a wiring diagram of a conventional A.C. "sine-wave" type limiter.

In such conventional form of limiter, a separate bias waveform generator E is required, as shown in FIGURE 3. This supplies fixed-amplitude full-wave rectified sinusoidal pulses to each diode CR1 and CR2, one output consisting of positive pulses, the other negative. Thus, when the signal across A′B′ exceeds the bias level having the same polarity, that diode will conduct in the forward direction allowing the sinusoidal bias voltage to appear across terminals A′B′. Since no clipping occurs, a filter is not required.

Figure 1:
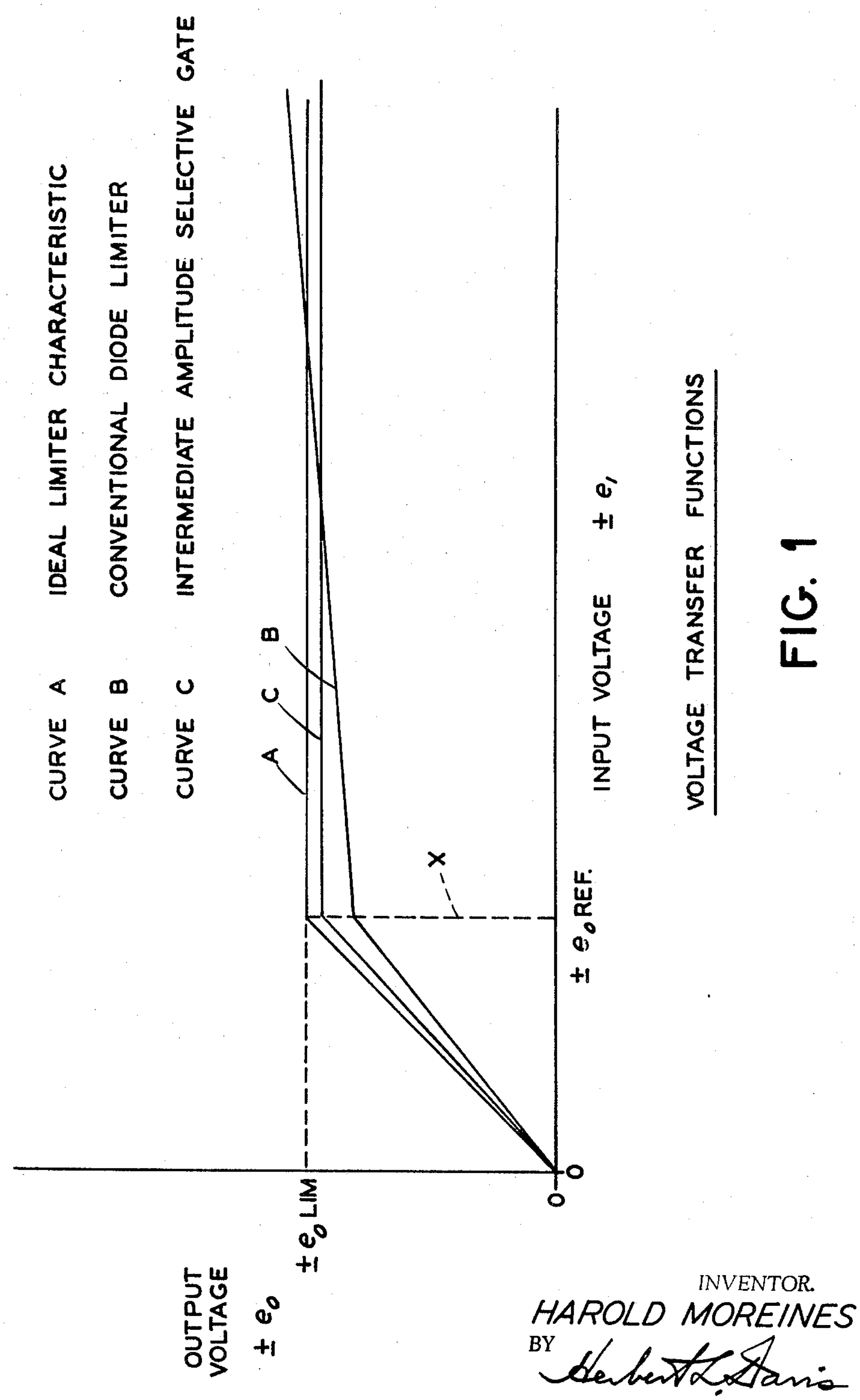
FIGURE 1 is a graphical illustration showing by a curve A a voltage transfer function of an ideal limiter; by curve B the voltage transfer functions of a conventional type diode limiter; and by the curve C the voltage transfer functions effected by the improved intermediate amplitude selective gate type limiter of the present invention.

In both the conventional clipper type limiter of FIGURE 2 and the conventional "sine-wave" limiter of FIGURE 3, a signal is attenuated through a large series resistor RS which means that as a signal increases beyond the limiting point X indicated in the graph of FIGURE 1 by a dotted line, there is effected an undesirable increase in the output signal.

Although such conventional limiter may provide asymmetrical limits for D.C. applications, it does not possess this capability when used in A.C. systems. This is because the reference bias voltages are applied alternately to the diodes CR1 and CR2 for one half cycle of carrier frequency regardless of the signal polarity. Thus, any asymmetry in the reference levels would result in an output waveform having even-harmonic asymmetry distortion in the limiting region for either signal polarity without actually accomplishing asymmetrical limiting.

In the intermediate amplitude selective gate limiter 4 of the present invention, each reference voltage is effective in limiting only when the signal voltage is in phase with that particular reference voltage. Thus, the limits can be set independently, where asymmetrical limits are a requirement.

Figure 4:
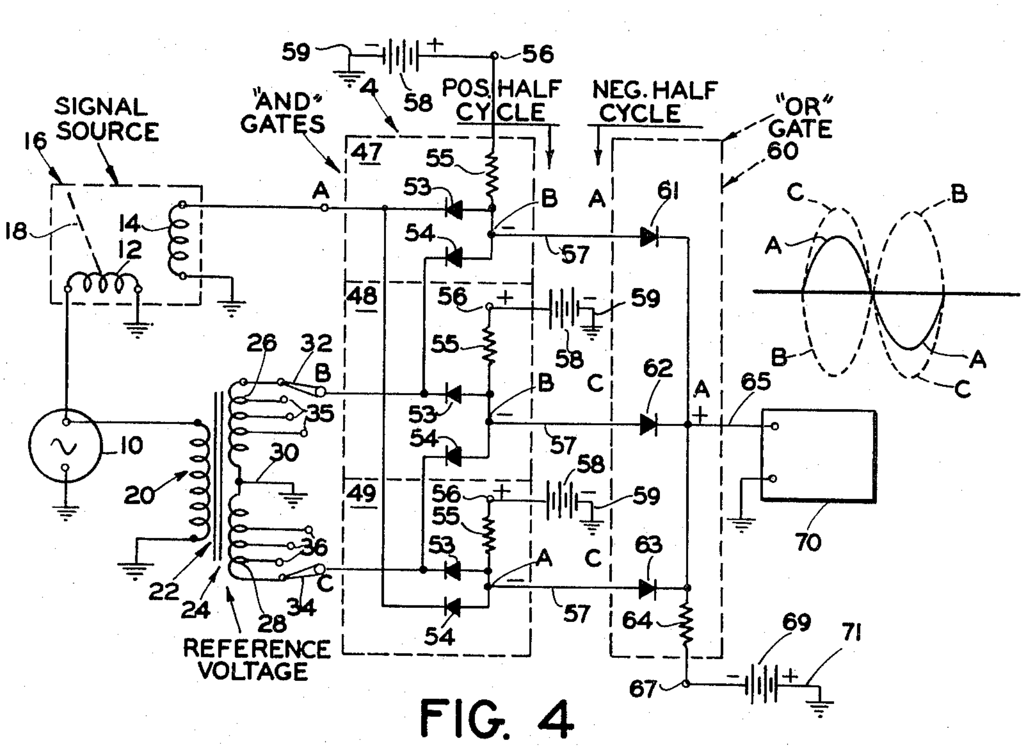
FIGURE 4 is a wiring diagram of an intermediate amplitude selective gate type limiter embodying the present invention.

Referring now to the form of the invention illustrated in FIGURE 4, there is indicated by the numeral 10 a suitable source of A.C. which is operatively connected across a primary winding 12 which may be adjustably positioned in variable coupling relation to a secondary winding 14 of a variable induction device 16 connected to an input A of the limiter 4. The device 16 may be a synchro or other suitable means providing a variable magnitude A.C. signal of a selected phase. The variable coupling primary winding 12 may be adjustably positioned by a shaft 18 to select the phase of the A.C. signal and vary the magnitude of the signal from zero to a maximum magnitude.

There is further connected across the A.C. source 10 a primary winding 20 of a transformer 22 having a secondary winding 24 including split windings 26 and 28 having a common ground connection 30. The opposite end of the winding 26 is connected through an adjustable switching device 32 to input B of the limiter 4 while the opposite end of the winding 28 is similarly connected through an adjustable switching device 34 to an input C of the limiter 4.

The switching device 32 is cooperatively arranged in relation to contacts 35 to vary the effective windings of the split winding 26 while the switching device 34 is cooperatively arranged in relation to contacts 36 to vary the effective windings of the split winding 28. The reference voltages applied by the split windings 26 and 28 to the inputs B and C of the limiter 4 are of opposite phase.

As shown in FIGURE 4, the intermediate-amplitude selective gate limiter 4 includes a combination of "AND" gates 47, 48, and 49 forming three channels to compare the A.C. signals from the signal source 16 applied at input A with the A.C. reference voltages supplied by the transformer 22 to the inputs B and C.

In the arrangement of the "AND" gates 47, 48, and 49, the A.C. signal of variable phase and amplitude from the device 16 applied at the input A and the A.C. reference voltage from winding 26 applied at input B are supplied to the "AND" gate 47; the A.C. reference voltages of opposite phase from windings 26 and 28 applied at inputs B and C are supplied to "AND" gate 48; and the alternating current signal from the device 16 applied at input A and the alternating current reference voltage from winding 28 applied at input C are supplied to "AND" gate 49.

The "AND" gates 47, 48, and 49 each include two input diodes 53 and 54, a current limiting resistor 55 connected to a positive potential at 56 and an output 57. The positive potential at 56 is supplied from a source of electrical energy or battery 58 having a negative terminal grounded at 59. The amplitude selective property of each of the "AND" gates 47, 48, and 49 is such that if the two input signals are applied to the input diodes 53 and 54, respectively, the output at 57 will be equal to the most negative of the inputs.

The amplitude of the biasing voltage applied by the battery 58 exceeds the amplitudes of the sinusoidal signal voltage A and the sinusoidal reference voltages B and C so that at least one of the pair of diodes of the "AND" gates 47, 48 and 49 is maintained conducting during one half cycle of the effective sinusoidal voltage waves applied thereto, but in varying degrees dependent upon the relative amplitudes of the one half cycle of the sinusoidal signal voltages A, B and C applied at the inputs to the diodes of the "AND" gates. However, during the other half cycle of the effective sinusoidal voltage waves at least one of the other of the pair of diodes of the "AND" gates 47, 48 and 49 will be rendered conductive.

The conductive diode of the "AND" gate effects a "clamping action" which clamps the output voltage at conductor 57 with respect to the input voltage applied to the conductive diode which in turn back biases the other of the pair of diodes of the "AND" gate to render such other diode non-conductive. Both of the pair of diodes of the "AND" gates 47, 48 and 49 are rendered conductive by the biasing voltage applied by the battery 58 around the zero axis crossing of the sinusoidal voltage waves A, B and C.

In combination with the "AND" gates 47, 48, and 49, there is further provided, as shown in FIGURE 4, a conventional diode logic "OR" gate 60 including three input diodes 61, 62, and 63 and a current limiting resistor 64 connected to a negative potential at 67 and an output 65. The negative potential at 67 is supplied by a source of electrical energy or battery 69 having a positive terminal grounded at 71.

The amplitude of the biasing voltage applied by the battery 69 exceeds the amplitudes of the three sinusoidal output voltages of the "AND" gates 47, 48 and 49 applied through the conductors 57 to the inputs of the diodes 61, 62 and 63 of the "OR" gate 60 so that at least one of these diodes of the "OR" gates 60 will be maintained conducting during one half cycle of the sinusoidal input voltage applied thereto, but in varying degrees dependent upon the relative amplitudes of the sinusoidal voltages applied at the inputs to the diodes 61, 62 and 63 of the "OR" gate 60. However, during the other half cycle of the effective sinusoidal input voltage waves at least one of the other of the diodes of the "OR" gate 60 is maintained conductive.

The conductive diode of the "OR" gate 60 effects a "clamping action" which clamps the output voltage at conductor 65 with respect to the input voltage applied to the conductive diode which in turn back biases the other of the diodes of the "OR" gate 60 to render such other diodes non-conductive. All three of the diodes of the "OR" gate 60 are rendered conductive by the biasing voltage applied by the battery 69 around the zero axis crossing of the sinusoidal voltage waves applied through the conductors 57 to the inputs of the diodes 61, 62 and 63 of the "OR" gate 60.

The amplitude selective property of this "OR" gate 60 is such that if three signals are applied to the input diodes 61, 62, and 63, the output at 65 would be equal to the most positive of the inputs. The output 65 is connected to a suitable electrical control system 70 operated thereby.

In both the "AND" gate circuits 47, 48, and 49, and the "OR" gate circuit 60, the aforenoted properties hold true on an instantaneous basis as heretofore explained in the copending U.S. application Ser. No. 314,397.

The waveforms of the A.C. inputs at A, B, and C are illustrated graphically by way of example at the right of FIGURE 4 with the waveform of the selective intermediate amplitude A.C. output signal which may correspond to the input signal A being shown by a solid line while the nonselected oppositely phased A.C. reference voltages applied at inputs B and C being shown by the dotted line curves B and C.

*Modified form of intermediate selective gate*

Figure 5:
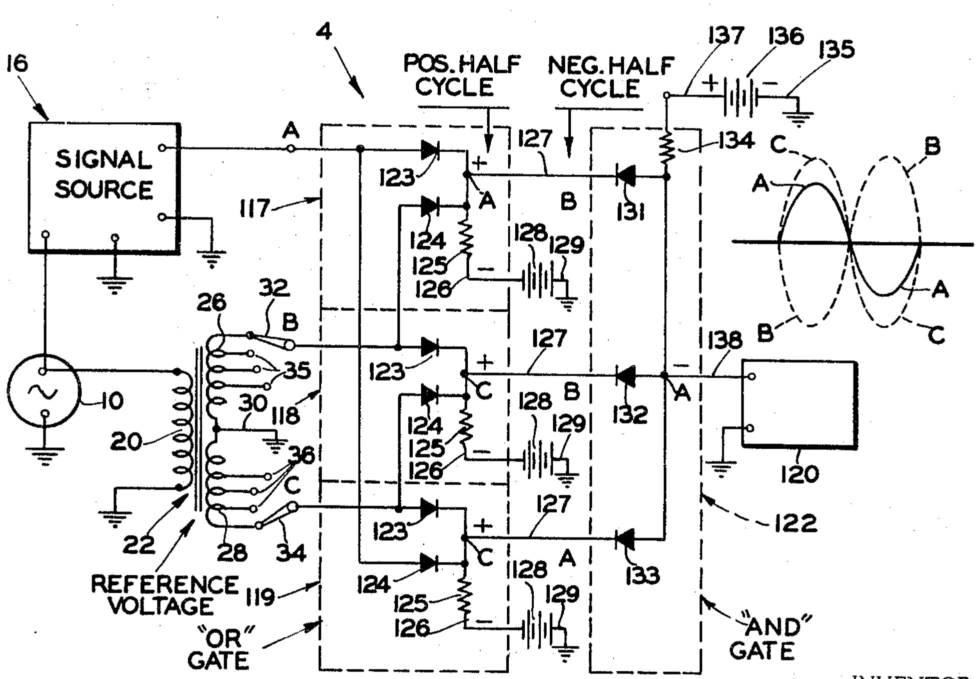
FIGURE 5 is a wiring diagram of a modified form of the intermediate amplitude selective gate type limiter of the present invention.

An alternative form of intermediate amplitude selective gate, as applied to a signal limiting means embodying the invention, is illustrated in FIGURE 5 showing a combination of "OR" and "AND" gate circuits wherein three "OR" gates 117, 118, and 119 form three channels to compare the variable magnitude A.C. signal from the signal device 16 with the oppositely phased A.C. limiting voltages from the reference voltage source 22.

The outputs of "OR" gates 117, 118, and 119 are connected to the inputs of an "AND" gate 122 which selectively emits an alternating current signal equal to the most negative signal applied and resulting in an intermediate amplitude alternating current output signal which may correspond to the signal A from the signal source 16, and which is in turn applied to a suitable control system 120 operated thereby.

As shown in FIGURE 5, each of the "OR" gates 117, 118, and 119 includes two input diodes 123 and 124, a current limiting resistor 125 connected to a negative potential at 126 and to the output conductor 127 leading from the two input diodes 123 and 124. The negative potential at 126 is provided by a suitable source of direct current or battery 128 having its positive terminal connected to ground at 129.

The amplitude of the biasing voltage applied by the battery 128 exceed the amplitudes of the sinusoidal signal voltage A and the sinusoidal reference voltages B and C so that at least one of the pair of diodes, of the "OR" gates 117, 118 and 119 is maintained conducting during one half cycle of the effective sinusoidal voltage waves applied thereto, but in varying degrees dependent upon the relative amplitudes of the one half cycle of the sinusoidal signal voltages A, B and C applied at the inputs to the diodes of the "OR" gates. However, during the other half cycle of the effective sinusoidal voltage waves at least one of the other of the pair of diodes of the "OR" gates 117, 118 and 119 will be rendered conductive.

The conductive diode of the "OR" gate effects a "clamping action" which clamps the output voltage at conductor 127 with respect to the input voltage applied to the conductive diode which in turn back biases the other of the pair of diodes of the "OR" gate to render such other diode non-conductive. Both of the pair of diodes of the "OR" gates 117, 118 and 119 are rendered conductive by the biasing voltage applied by the battery 128 around the zero axis crossing of the sinusoidal voltage waves A, B and C. The amplitude selective property of the "OR" gate circuit 117 is such that if two signals are applied to the inputs of the diodes 123 and 124, respectively, the output at 127 is essentially equal to the most positive of the inputs.

Referring to the drawing of FIGURE 5, there is operatively connected to the outputs 127 of the "OR" gates 117, 118, and 119 an "AND" gate 122 which includes three input diodes 131, 132, and 133 connected respectively to the output lines 127 from the "OR" gates 117, 118, and 119, respectively. There is further provided a current limiting resistor 134 connected at one end to a positive potential at 137 from a battery 136. The opposite end of the resistor 134 is connected to an output line 138 leading from the outputs of the diodes 131, 132, and 133. The negative potential of the battery 136 is grounded at 135.

The amplitude of the biasing voltage applied by the battery 136 exceeds the amplitudes of the three sinusoidal output voltages of the "OR" gates 117, 118 and 119 applied through the conductors 127 to the inputs of the diodes 131, 132 and 133 of the "AND" gate 122 so that at least one of these diodes of the "AND" gate 122 will be maintained conducting during one half cycle of the sinusoidal input voltage applied thereto, but in varying degrees dependent upon the relative amplitudes of the sinusoidal voltages applied at the inputs to the diodes 131, 132 and 133 of the "AND" gate 122. However, during the other half cycle of the effective sinusoidal input voltage waves at least one of the other of the diodes of the "AND" gate 122 is maintained conductive.

The conductive diode of the "AND" gate 122 effects a "clamping action" which clamps the output voltage at conductor 138 with respect to the input voltage applied to the conductive diode which in turn back biases the other of the diodes of the "AND" gate 122 to render such other diodes non-conductive. All three of the diodes of the "AND" gate 122 are rendered conductive by the biasing voltage applied by the battery 136 around the zero axis crossing of the sinusoidal voltage waves applied through the conductors 127 to the inputs of the diodes 131, 132 and 133 of the "AND" gate 122. The amplitude selective property of the "AND" gate circuit 122 is such that, if three signals are applied through the output lines 127 from "OR" gates 117, 118, and 119 to the input diodes 131, 132, 133, the output at the line 138 leading to the control system 120 would be essentially equal to the most negative of the inputs. In both the circuit of the "OR" gates 117, 118, and 119 and the circuit of the "AND" gate 122, the properties of selecting respectively the most positive and the most negative of the applied inputs holds true on an instantaneous basis.

Thus, as shown in FIGURE 5, alternating current input signal A and reference voltage B from the signal device 16 and the reference voltage winding 26, respectively, are applied to "OR" gate 117; oppositely phased alternating current reference voltages B and C from reference voltage windings 26 and 28, respectively, are applied to the "OR" gate 118; and alternating current input signal A and reference voltage C from the signal device 16 and the reference voltage winding source 28, respectively, are applied to "OR" gate 119.

The waveforms of these input signals A, B, and C, are shown graphically by way of example at the right of FIGURE 5 and the more positive of each of these pairs of alternating current input signals is emitted at the output 127 of each "OR" gate. These output signals are then applied to an "AND" gate 122 which selectively emits an alternating current signal at the output line 138 equal to the most negative signal applied and resulting in a selected intermediate amplitude A.C. output signal which may correspond to the input signal A and it may have the waveform illustrated graphically in solid line at the right of FIGURE 5 relative to the limiting reference voltages provided by the windings 26 and 28 and having the waveforms B and C being illustrated by dotted lines.

The operation of the intermediate amplitude selective gate limiters of FIGURES 4 and 5 serves to select a signal which is intermediate the other two signals. The selected signal which may correspond to the variable amplitude signal A provided by the signal device 16 must lie between a set of upper and lower limits delineated by the reference voltages provided by the windings 26 and 28. However, in the event the variable amplitude signal provided from the signal source or device 16 exceeds one or the other of these bounds or reference voltages, then the reference voltage B or C provided by the windings 26 and 28 becomes the intermediate signal, since it will now fall within the extremes delineated by the signal A and the other reference voltage and hence will become the controlling signal applied at the output line 138. Hence, a selected intermediate amplitude signal applied at the output line 138 is one of the signals or reference voltages falling within the limits defined by the two other voltages or signals.

*Threshold type control system*

Figures 6, 7:
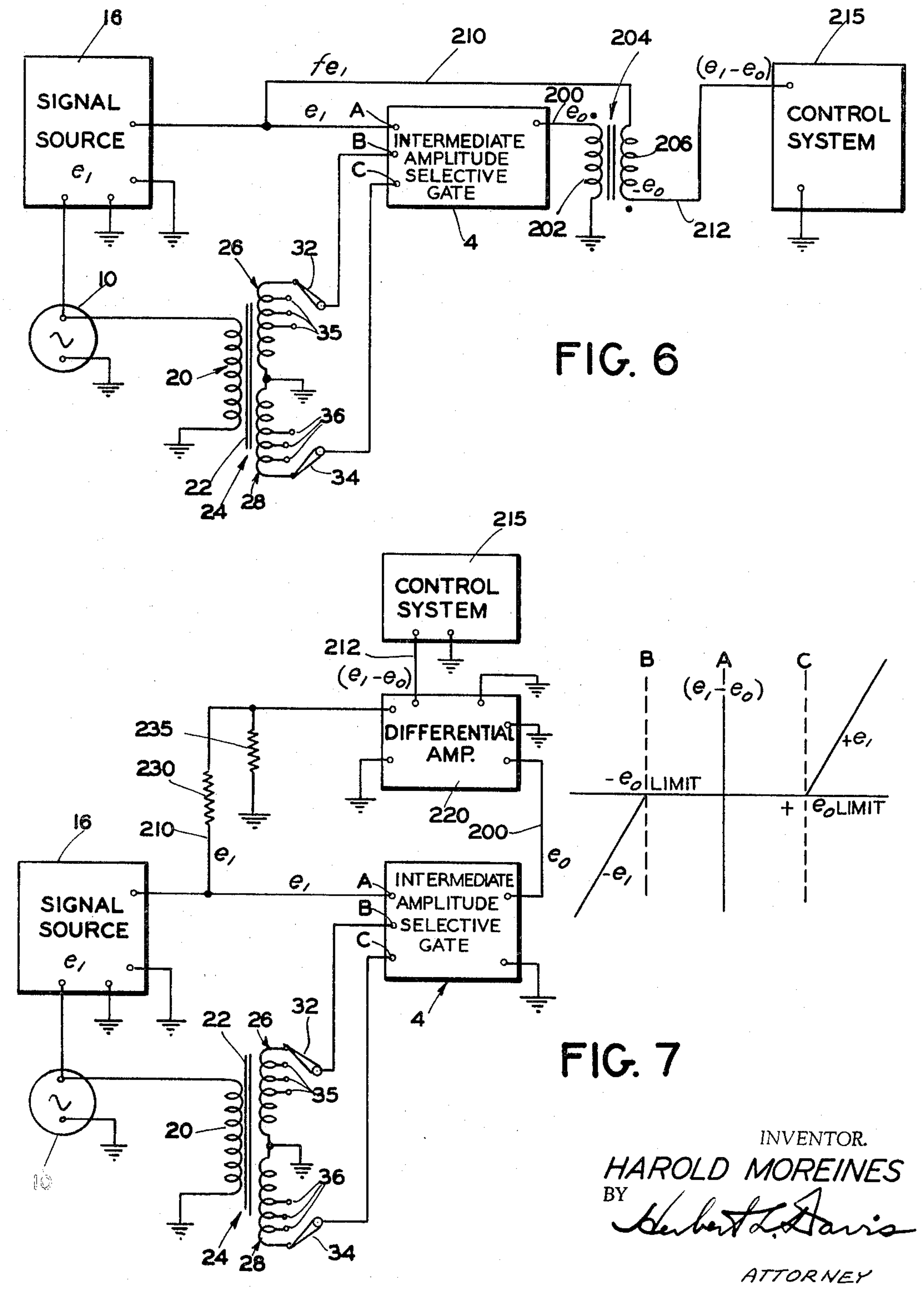
FIGURE 6 is a wiring diagram of an intermediate amplitude selective gate type threshold limiter embodying the present invention.
FIGURE 7 is a modified form of intermediate-amplitude selective gate type threshold limiter embodying the present invention.

In the form of the invention illustrated in FIGURE 6, the intermediate amplitude selective gate 4 which may be of the form illustrated in FIGURE 4 or in FIGURE 5 has an output signal $e_0$ applied through a conductor 200 to the primary winding 202 of a differential coupling transformer 204 having a secondary winding 206 connected at one end through a conductor 210 to an input signal $e_1$ at the input A of the limiter 4 leading from the signal device 16. The opposite end of the secondary winding 206 is connected by a conductor 212 so as to apply a differential signal $e_1 - e_0$ to the input of a suitable control system 215 to be operated thereby.

An alternative form of the invention is shown in FIGURE 7 in which the input A of the limiter 4 leading from the signal device 16 is connected by a conductor 210 to an input of a differential amplifier 220 which may be of a suitable type such as disclosed in copending U.S. application Ser. No. 318,050, filed Oct. 22, 1962, by Robert L. Worthington and Frank J. Thomas, and assigned to The Bendix Corporation.

The opposite input to the differential amplifier 220 is connected by a conductor 200 leading from the output of the limiter 4. The differential amplifier 220, as in the case of the differential coupling transformer 204, applies a signal through the output line 212 to the control system 215, and which signal corresponds to the difference between the signal $e_1$ at A and the signal $e_0$ applied at the output of the limiter 4.

It will be seen that in such arrangement so long as the signal $e_1$ at A applied from the signal source 16 is within the limits defined by the reference voltages applied by the windings 26 and 28, the signal $e_0$ applied at the output of the limiter 4 must be equal to the input signal $e_1$ at A, and therefore, there would be no difference in the signals so that there would be no differential signal applied by the line 212 to the control system 215.

However, upon the variable amplitude input signal $e_1$ at A being of a value such as to exceed either the limiting reference voltage applied from the winding 26 or 28, the selected controlling signal $e_0$ at the output will then be equal to one or the other of the A.C. reference voltages applied at B or C as the case may be, and there would then be a difference in magnitude between the variable input signal $e_1$ at A and the limiting reference voltage $e_0$ applied at the output of the limiter 4 so that there would then be applied through the line 212 to the system 215 a differential signal $e_1 - e_0$ equal to such difference.

The aforenoted operation of the limiters of FIGURES 6 and 7 will then give rise to a threshold type characteristic in which adjustment of the variable amplitude signal device 16 so as to provide a signal $e_1$ at A of a magnitude within the extremes provided by the opposite phased limiting reference voltages applied at B and C by the windings 26 and 28 will effect a null signal at the differential output line 212, while upon an adjustment of the signal device 16 so as to provide an output signal $e_1$ at A exceeding in magnitude one or the other of the limits provided by the reference voltages at B and C, there will result a differential output signal $e_1 - e_0$ at the line 212 equivalent to the difference between the output signal $e_1$ at A and the output signal $e_0$ from the limiter 4, as indicated graphically in the graph to the right of FIGURE 7.

Further, to compensate for very slight attenuation effected through the limiter 4 of FIGURE 6, between the input signal $e_1$ and the selected output signal $e_0$ applied at the output conductor 200, the turns ratio between windings 202 and 206 of the transformer 204 may be so selected that the product of the limiter 4 attenuation and transformer 204 voltage ratio is unity.

In reference to the form of the invention of FIGURE 7, the input signal $e_1$ applied through the line 210 to the differential amplifier 220 may be attenuated by a simple resistive voltage divider including series resistor 230 and shunt resistor 235 so selected that the resulting attenuation is equal to the attenuation through the limiter 4 effected between the input signal $e_1$ and the output signal $e_0$.

It will be further seen that, in the signal limiting means provided in FIGURES 4, 5, 6, and 7, the switch elements 32 and 34 are arranged to selectively engage variable contacts 35 and 36, respectively, so as to vary the effective windings of the reference voltage windings 26 and 28 so that the selected limits may be adjusted as determined by the operator.

From the foregoing, it will be seen that there has been provided a signal limiting means in which there is provided a novel combination of diode "AND-OR" gates to select as an effective controlling signal a variable magnitude input signal A provided the magnitude of the signal A is less than that of either reference voltage B or C. However, if the variable magnitude signal A exceeds the magnitude of the reference voltage B in a positive half cycle, then the reference voltage B is selected as an effective controlling signal; or if the variable magnitude of the signal A exceeds the magnitude of the reference voltage C in a negative half cycle, then the reference voltage C is selected as an effective controlling signal.

Furthermore, from the operating characteristics of the intermediate amplitude selective gate limiter 4 of the present invention, as shown by curve C of FIGURE 1, it will be seen that such limiter 4 is capable of far greater precision in limiting than the typical conventional diode limiter of FIGURES 2 and 3. This may be attributed in part to the absence of an intermediate amplitude selective gate requirement for a large *series* dropping resistance to handle large overvoltage potentials. In the intermediate amplitude selective gate limiter of the present invention, over-voltages are applied either across nonconducting diodes or resistors (55 or 125) which are in *shunt* with the load, rather than in *series.*

Furthermore, the intermediate amplitude selective gate limiter of the present invention is adapted for use with D.C. voltages, and with A.C. carrier or pulsed data. This is also true for limiter application, particularly if asymmetrical limits are required. In the case of pulse-amplitude modulated data, fixed amplitude reference pulses having amplitudes equal to the desired limits, and of opposite polarity, are required. If pulse-width modulated data are employed, then the reference pulses required are of opposite polarity, but equal in duration to the desired pulse-width limit.

The present invention includes the following features:

(1) There has been provided a means for signal limiting, applicable to many forms of data, including D.C. voltage, A.C. carrier, pulse-amplitude modulated and pulse-width modulated voltages.

(2) The signal selection circuit is completely passive, simple, and reliable.

(3) The intermediate-amplitude selective gate limiter is superior to conventional diode limiters in respect to achieving more ideal limiting characteristics.

(4) The intermediate-amplitude selective gate limiter is particularly amenable to asymmetrical limit applications for all forms of data, whereas the conventional diode limiter is not suited to this requirement when used in A.C. carrier systems.

(5) The intermediate-amplitude selective gate limiter performance characteristics are relatively unaffected by variations in components, due to the excellent ratios between typical diode resistances and load resistance, and to the elimination of large series resistance elements.

(6) The selected limits may be varied in *unison* or *independently* as a function of one or more parameters by having the reference voltage or voltages variable by adjustment of the selector switches 32 and 34.

(7) The signal limiter means may be employed to accomplish threshold (dead-space) operation by placing the intermediate-amplitude selective gate limiter across the inputs to a differential amplifier, as shown in FIGURES 6 and 7, and since the limiter has capability for asymmetric limits, the threshold circuit, likewise, can be set for asymmetric dead-space, a feature not readily attainable with conventional A.C. limiters.

While several embodiments of the invention have been illustrated and described, various changes in the form and relative arrangements of the parts, which will now appear to those skilled in the art may be made without departing from the scope of the invention. Reference, therefore, is to be had to the appended claims for a definition of the limits of the invention.

What is claimed is:

1. In a control system, means for limiting a control signal comprising means for effecting a controlling voltage signal of varying amplitude and sense, other means for effecting first and second voltage signals of opposite senses, a gate for selecting an intermediate amplitude signal from among said three signals for controlling the system, said gate comprising a plurality of "AND" gate means each of which includes two diodes and a current limiting resistor connected to a positive potential for selecting and providing as an output signal the more negative of two of said three signals applied to the diodes, in combination with "OR" gate means including a current limiting resistor connected to a negative potential and a plurality of input diodes to which said output signals are connected for selecting the most positive of said output signals as an intermediate amplitude signal for controlling said system.

2. In a control system, means for limiting a control signal comprising means for effecting a controlling voltage signal of varying amplitude and sense, other means for effecting first and second voltage signals of opposite senses, a gate for selecting an intermediate amplitude signal from among said three signals for controlling the system, said gate comprising a plurality of "OR" gate means each of which includes two diodes and a current limiting resistor connected to a negative potential for selecting and providing as an output signal the more positive of two of said three signals applied to the diodes, in combination with "AND" gate means including a current limiting resistor connected to a positive potential and a plurality of input diodes to which said output signals are connected for selecting the most negative of said output signals as an intermediate amplitude signal for controlling said system.

3. In a control system, means for limiting a control signal comprising means for effecting a controlling electrical signal of varying amplitude and sense, other means for effecting first and second electrical signals of opposite senses, a gate for selecting an intermediate amplitude signal from among said three signals for controlling the system, said gate comprising three primary gate means, each of said primary gate means including a pair of diodes and a current limiting resistor connected to a source of voltage in one sense, the pair of diodes of each of said primary gate means having inputs connected respectively to a different pair of each of said three electrical signals, the pair of diodes and current limiting resistor of each of said primary gate means being so arranged that said three primary gate means provide as three secondary output signals respectively the greater in one sense of each of said different pairs of three electrical signals, a secondary gate means including three diodes and a current limiting resistor connected to a source of voltage in an opposite sense from the current limiting resistor of the primary gate means and so arranged that the diodes of the secondary gate means act on said three secondary output signals in an opposite sense from the diodes of said primary gate means so as to provide as a main output signal from the diodes of the secondary gate means the greater in an opposite sense of said three secondary output signals applied to the diodes of said secondary gate means and thereby an output signal of said intermediate amplitude to control said system.

4. In a control system, means for limiting a control signal comprising means for effecting a controlling alternating current signal of varying amplitude and phase, other means for effecting first and second alternating current reference signals having opposite phases, a gate for selecting an intermediate amplitude alternating current signal from among said three signals for controlling the system, said gate comprising input means for receiving said alternating current signals, a plurality of means connected to said input means for selecting and providing as a first output the most negative signal of the alternating current signals applied thereto in combination with other means for selecting and providing as a second output the most positive of said first alternating current output signals as an intermediate amplitude alternating current signal for controlling said system.

5. In a control system, means for limiting a control signal comprising means for effecting a controlling alternating current signal of varying amplitude and phase, other means for effecting first and second alternating current signals having opposite phases, a gate for selecting an intermediate amplitude alternating current signal from among said three signals for controlling the system, said gate comprising input means for receiving said alternating current signals, a plurality of means connected to said input means for selecting and providing as a first output the most positive signal of the alternating current signals applied thereto in combination with other means for selecting and providing as a second output the most negative of said first alternating current output signals as an intermediate amplitude alternating current signal for controlling said system.

6. In a control system, means for limiting a control signal comprising means for effecting a controlling alternating current signal of varying amplitude and phase, other means for effecting first and second alternating current reference signals having opposite phases, a gate for selecting an intermediate amplitude alternating current signal from among said three signals for controlling the system, said gate comprising input means for receiving said alternating current signals, a plurality of means connected to said input means for selecting and providing as a first output the greater in one sense of the alternating current signals applied thereto in combination with other means for selecting and providing as a second output the greater in an opposite sense of said first alternating current output signals as an intermediate amplitude alternating current signal for controlling said system.

7. In a control system, means for limiting a control signal comprising means for effecting a controlling alternating current signal of varying amplitude and phase, other means for effecting first and second alternating current reference signals having opposite phases, a gate for selecting an intermediate amplitude alternating current signal from among said three signals for controlling the system, said gate comprising a plurality of "AND" gate means for selecting and providing as an alternating current output signal the more negative of two input signals applied thereto in combination with "OR" gate means for selecting the most positive of said output signals as an intermediate amplitude signal for controlling said system.

8. In a control system, means for limiting a control signal comprising means for effecting a controlling alternating current signal of varying amplitude and phase, other means for effecting first and second alternating current reference signals having opposite phases, a gate for selecting an intermediate amplitude alternating current signal from among said three signals for controlling the system, said gate comprising a plurality of "OR" gate means for selecting and providing as an alternating current output signal the more positive of two input signals applied thereto in combination with "AND" gate means for selecting the most negative of said output signals as as intermediate amplitude signal for controlling said system.

9. In a control system, means for limiting a control signal comprising means for effecting a controlling alternating current signal of varying amplitude and phase, other means for effecting first and second alternating current reference signals having opposite phases, a gate for selecting an intermediate amplitude alternating current signal from among said three alternating current signals for controlling the system, said gate comprising several first gate means corresponding in number to said three alternating current signals, each of said first gate means for selecting and providing as a first alternating current output signal the greater in one sense of two of said three alternating current signals applied thereto, in combination with a second gate means, said second gate means for selecting from the first alternating current output signals and providing as a second alternating current output signal the greater in an opposite sense of the first alternating current output signals so as to provide said second alternating current output signal of an amplitude intermediate said first-mentioned three alternating current signals to control said system.

10. In a control system, means for limiting a control signal comprising means for effecting a controlling electrical signal of varying amplitude and sense, other means for effecting first and second electrical reference signals of opposite sense, and means of selecting among said several electrical signals the electrical signal having an amplitude intermediate that of the other signals.

11. In a control system, means for limiting a control signal comprising means for effecting a controlling electrical signal of varying amplitude and sense, other means for effecting first and second electrical reference signals of opposite sense, means for selecting among said several electrical signals the electrical signal having an amplitude intermediate that of the other signals, said selecting means comprising several first gate means corresponding in number to said several electrical signals, each of said first gate means for selecting and providing as a first electrical output signal the greater in one sense of two of said several electrical signals applied thereto, in combination with a second gate means, said second gate means for selecting from the first electrical output signals and providing as a second electrical output signal the greater in an opposite sense of the first electrical, output signals so as to provide said second electrical output signal of said amplitude intermediate that of the other of said several electrical signals to control said system.

12. In a control system, means for limiting a control signal comprising means for effecting a controlling electrical signal of varying amplitude and sense, other means for effecting first and second electrical reference signals of opposite sense, means for selecting among said several electrical signals the electrical signal having an amplitude intermediate that of the other signals, said selecting means comprising several primary gate means corresponding in number to said several signals, each of said primary gate means including a pair of diodes and a current limiting resistor connected to a source of voltage in one sense, the pair of diodes of each of said primary gate means having inputs connected respectively to a different pair of each of said several signals, the pair of diodes and current limiting resistor of each of said primary gate means being so arranged that said several primary gate means provide as secondary output signals, respectively, the greater in one sense of each of said different pairs of several electrical signals, a secondary gate means including a plurality of diodes and a current limiting resistor connected to a source of voltage in an opposite sense from the current limiting resistor of the primary gate means and so arranged that the diodes of the secondary gate means act on said secondary output signals in an opposite sense from the diodes of said primary gate means so as to provide as a main output signal from the diodes of the secondary gate means the greater in an opposite sense of said secondary output signals applied to the diodes of said secondary gate means and thereby effect said main output signal of said amplitude intermediate that of the other of said several electrical signals to control said system.

13. In a control system, means for limiting a control signal comprising means for effecting an electrical signal of varying amplitude and sense, other means for effecting first and second reference electrical signals of opposite sense, a device for selecting an intermediate amplitude signal from among said three signals, said device comprising inputs for receiving said signals, gating means connected to said inputs for selecting and providing as first output signals the greater in one sense of the signals applied thereto, in combination with other gating means for selecting from said first output signals and providing as a second output signal the greater in an opposite sense of said first output signals so as to effect a median amplitude signal selection from among said three signals for controlling said system.

14. In a control system, means for limiting a control signal comprising means for effecting a first electrical input signal of varying amplitude and sense, other means for effecting second and third electrical reference input signals of opposite sense, a device for selecting an intermediate amplitude signal from among said three electrical input signals, said device comprising input means for receiving said input signals, a plurality of means connected to said input means for selecting and providing as first electrical output signals the greater in one sense of the input signals applied thereto in combination with other means for selecting and providing as a second electrical output signal the greater in an opposite sense of said first electrical output signals, electrical differential means operatively connected between said first electrical input signal and said second electrical output signal for providing a controlling electrical signal for said system corresponding to the difference between said first electrical input signal and said second electrical output signal.

15. The combination defined by claim 14 in which said differential means includes means for compensating for attenuation of the second electrical output signal effected by said selecting device.

16. The combination defined by claim 14 in which said electrical differential means includes a differential transformer, said transformer comprising a primary winding operatively connected to said second electrical output signal, and a secondary winding inductively coupled to said primary winding and operatively connected to the first electrical input signal and to said control system for providing a controlling signal corresponding to the difference between said first electrical input signal and said second electrical output signal.

17. The combination defined by claim 16 in which the primary and secondary windings of said differential transformer have a turns ratio selected to compensate for attenuation of the second electrical output signal effected by said selecting device.

18. The combination defined by claim 14 in which said electrical differential means includes a differential amplifier operatively connected to said first electrical input signal and said second electrical output signal for effecting a controlling electrical signal for said system.

corresponding to the difference between said first electrical input signal and said second electrical output signal.

19. The combination defined by claim 18 in which said differential means includes a voltage divider resistive means in said operative connection between said first electrical input signal and said differential amplifier to compensate for attenuation of the second electrical output signal effected by said selecting device.

References Cited by the Examiner

"Sine Wave Amplitude Limiter," by Van Winkle, IBM Technical Disclosure Bulletin, vol. 2 No. 4, December 1959, pp. 29 and 30.

ARTHUR, GAUSS, *Primary Examiner.*

R. H. EPSTEIN, *Assistant Examiner.*